Patented July 2, 1946

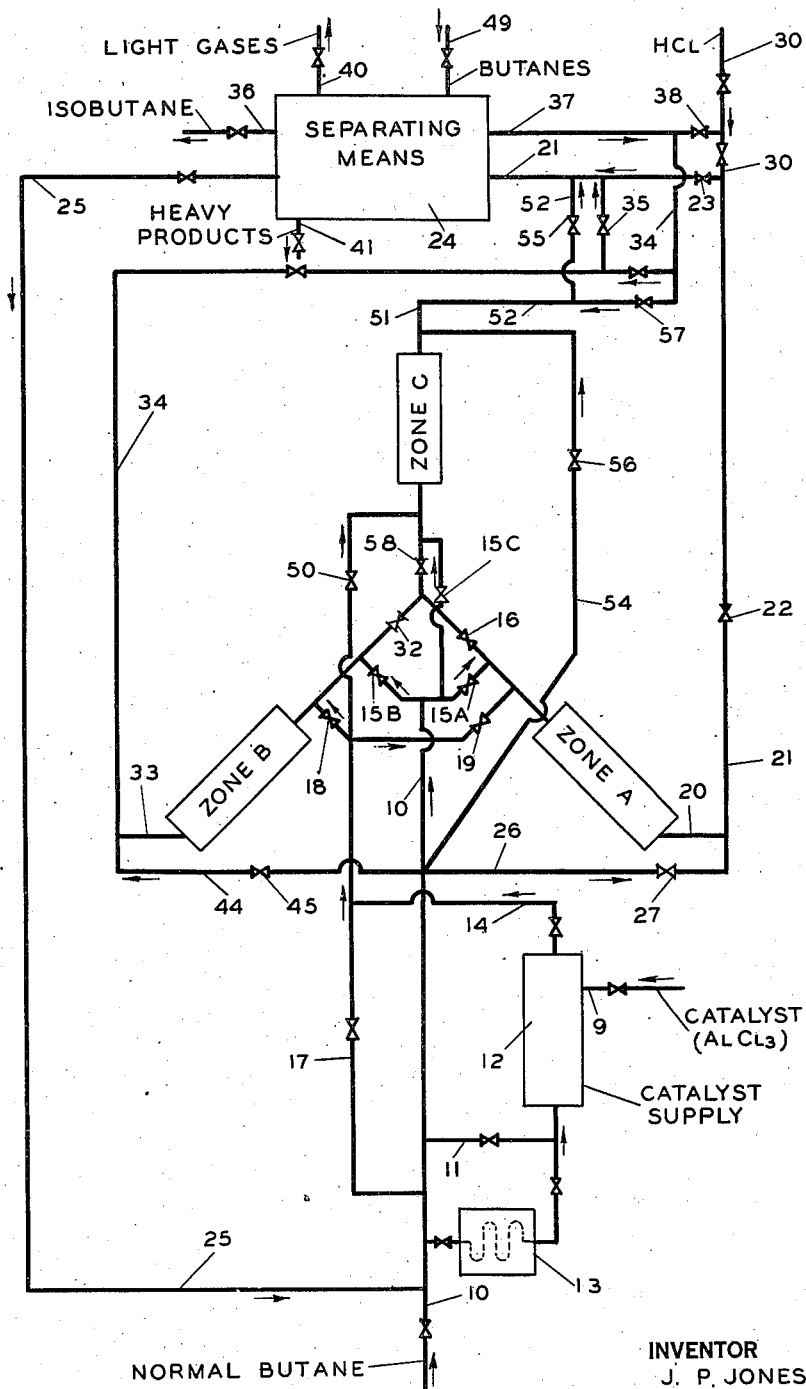

2,403,181

UNITED STATES PATENT OFFICE 2,403,181

PROCESS FOR THE ISOMERIZATION OF LOW-BOILING SATURATED HYDROCARBONS

Jean Paul Jones, Bartlesville, Okla., assignor to Phillips Petroleum Company, a corporation of Delaware Application May 27, 1944, Serial No. 537,716

12 Claims. (Cl. 260—683.5)

The present invention relates to an improvement in the method of executing reactions with the aid of contact masses containing a fugitive catalytic component.

By a fugitive catalytic component I mean a material which possesses catalytic properties and aids in, or is responsible for, the catalytic activity of a solid contact mass, and is not so soluble in, or miscible with, the reaction mixture but that it may be removed from effluents of a reaction zone, in which it may be present due to an appreciable vapor pressure and/or a small solubility in the reaction mixture, by contact of the reaction mixture with a solid adsorptive material. In the practice of my process a mass of granular adsorptive material is used both as a support, or carrier, for the fugitive catalyst, and to remove the fugitive catalyst from effluents of a reaction zone so that these effluents are substantially free from the fugitive catalytic component before they enter separating means for recovery of the products of the reaction. Such adsorptive materials may be activated charcoal, active alumina, active silica, and the like, either as artificially prepared from pure chemical materials as in the Activated Alumina and activated silica gel of commerce, or in the form of natural materials such as highly adsorptive fuller's earth, activated bauxite, and the like. The fugitive catalyst which is employed will, of course, depend to a considerable extent upon the chemical reaction. Thus, for the isomerization of saturated hydrocarbons various volatile metal halides such as aluminum chloride, aluminum bromide, zinc chloride, zinc bromide tin chloride, zirconium chloride, and some of the other halides of these same metals have been used and come within the term "fugitive catalyst." Similar metal halides may be used for the alkylation of an alkylatable hydrocarbon such as a low-boiling isoparaffin, cycloparaffin, or aromatic hydrocarbon. Although phosphoric acid is not generally considered to be a fugitive catalyst, processes in which this is used together with an adsorptive support for the polymerization of olefin hydrocarbons and the alkylation of isoparaffin hydrocarbons with olefins have been considerably handicapped by the presence of phosphoric acid in effluents of the reaction zones. Therefore, specific modifications of my invention relate even to such catalysts. In the conversion of mixtures comprising hydrogen halides and oxygen to the free halogen in the presence of some metal halides such as in the well known "Deacon" process wherein hydrogen chloride is converted to chlorine in the presence of cuprous chloride, considerable difficulties have arisen from volatilization of the catalyst; thus, even though cuprous chloride has a boiling point of about 2490° F., it will volatilize to an appreciable extent at temperatures no higher than about 800° F. Specific modifications of my invention can therefore be applied to reactions of this nature as well.

An object of my invention is to provide a method whereby catalysts containing a fugitive catalytic component may be employed more advantageously.

Another object of my invention is to provide an improved method for the isomerization of saturated hydrocarbons.

A further object of my invention is to provide an improved method for employing supported volatile metal halide catalysts in chemical reactions.

Still another object of my invention is to provide a method of employing fugitive catalysts for chemical reactions while maintaining effluents of said reactions free from said fugitive catalysts and/or while supplying additional quantities of said fugitive catalysts to the reaction zone to restore the activity of less active catalyst masses.

Further objects and advantages of my invention will become apparent to one skilled in the art from the accompanying disclosure and discussion.

In the practice of my invention at least two zones are used, each containing a mass of granular adsorptive material. While it is preferred that this mass be a stationary mass of granular material in which the particle size is relatively large, such as about 4 to 30 mesh, or of a narrower range of sizes within this broader range, it is to be understood that in some instances it may be desirable to operate with a mass of adsorptive material sufficiently finely divided as to be termed a "powder" in connection with which certain so-called "powder techniques" which are now well known to the art may be employed. While it is to be understood that, broadly speaking, my invention may be applied to a vast number of catalytic reactions, it is believed that the principles of my invention can be accurately described by describing in detail one of these possible processes in connection with the accompanying drawing. Therefore, my invention will be described as applied to a process for the isomerization of butane in the presence of an aluminum halide and a minor amount of hydrogen halide together with an adsorptive support for the aluminum halide.

Referring now to the accompanying drawing which illustrates diagrammatically an arrangement of apparatus in which normal butane may be isomerized to form isobutane, the isomerization may be conducted in two separate elongated zones A and B. When my isomerization process is started each of zones A and B is filled with a mass of granular adsorptive material, such as hard bauxite, having a particle size within the range of 10 to 20 mesh which has been dehydrated at a temperature of about 1100° F. to the extent that the water content is about 1 to 1½ per cent. Normal butane is charged to the system through pipe 10, and at least a substantial portion of it is diverted through pipe 11 to a catalyst supply vessel 12. Preferably at least a portion of normal butane is passed through heater 13 so that the material entering vessel 12 is at a suitable temperature, in this instance in the range of 250 to about 350° F. This catalyst supply vessel may be an ordinary tank filled with solid granular aluminum chloride which may be charged as through conduit 9. The hot normal butane, either in liquid or vapor phase, dissolves or vaporizes, as the case may be, aluminum chloride and the butane-aluminum chloride mixture passes through pipe 14 to pipe 17 and through valve 19 to one end of zone A, which, for convenience may be designated as the first end of this zone. All other valves and pipes connecting with pipes 10 and 17 are closed. However, if desired, a portion of the normal butane stream may be diverted from pipe 10 through valve 15B to zone B to keep zone B purged of undesired materials. The adsorptive material in zone A takes up aluminum chloride from the mixture charged through valve 19, thereby forming a supported aluminum chloride catalyst. Effluents of zone A passing through pipe 20, which leads from what may be called the second end of zone A, will be substantially free from aluminum chloride and may be passed through pipe 21 and valves 22 and 23 to separating means 24. In this instance separating means 24 will have little or no separation to effect, and normal butane may be removed therefrom through recycle line 25 and returned to pipe 10. This flow of material should be continued for a substantial length of time until zone A contains an appreciable amount of aluminum chloride such as about 5 per cent by weight of the adsorptive material originally present therein. It will be understood, of course, that the aluminum chloride will not be uniformly distributed throughout zone A, but that the adsorptive material near the first end of zone A will have a high content of aluminum chloride on it, while the adsorptive material near the second end of zone A will have little or no aluminum chloride on it. When this state has been reached, preferably just at or prior to the time when appreciable amounts of aluminum chloride appear in the butane passing through pipe 20, the flow of butane through catalyst supply vessel 12 is stopped, valve 19 is closed and butane is passed through pipe 10 and through pipe 26 and valve 27 to pipe 20 and the second end of zone A. This butane is at a suitable reaction temperature such as within the range initially of about 175 to 250° F. Hydrogen chloride is introduced to the system through pipe 30 and is passed through valve 22 to join the butane stream entering through pipe 20 in the second end of zone A. The combined mixture, which will contain about 1 to about 5 per cent by weight of hydrogen chloride, passes through zone A and then through valves 16 and 32 to zone B at what may be conveniently referred to as the first end of zone B. The temperature of this effluent from zone A will generally be somewhat higher than that of the mixture charged to zone A since the conversion of normal butane to isobutane is an exothermic reaction. This material may enter zone B at the temperature at which it leaves zone A, or it may be at a somewhat lower temperature which may be reached by the injection of cooler butane through valve 18 or by any other suitable cooling means. As the material passes through zone B the adsorptive material contained therein takes up aluminum chloride so that the effluent of this zone, which is removed through pipe 33 leading from what may be referred to as the second end of zone B, is substantially free from aluminum chloride. This mixture, comprising primarily isobutane in an amount between about 25 and 60 per cent, unreacted normal butane, and a small amount of hydrogen chloride, is passed through pipes 33 and 34 and valve 35 to the far end of pipe 21 and separating means 24. Isobutane is recovered as a product of the process through pipe 36; unreacted normal butane is recovered through pipe 25 and returned to pipe 10; hydrogen chloride is removed through pipe 37, and is passed through valve 38 to pipe 30 for recycle to the reaction system. Any undesired light gases may be discharged through pipe 40, and any undesired heavy products, such as isopentane and heavier, may be discharged through pipe 41.

It will, of course, be appreciated that separating means 24 will in any particular case comprise various fractional distillation columns, surge tanks, pumps, heating means, means for cooling and condensing overhead streams, and the like well known to the art. If desired, a butane mixture may be charged to separating means 24 through pipe 49 as the sole feed to the system.

As the process continues the catalyst in zone A will decline in activity both as a result of transfer of aluminum chloride to the first end of zone B and of a decline in activity of the aluminum chloride resulting from inevitable side reactions. If desired, as the conversion declines, the temperature of the material charged may be raised and/or the concentration of hydrogen chloride may be increased to maintain a relatively steady rate of conversion. It will, of course, be appreciated that as aluminum chloride accumulates in the first end of zone B some reaction will also take place in this zone and there will be a declining gradient of aluminum chloride concentration from the first end to the second end of zone B.

When the activity of the catalyst has declined to the point where further operation is no longer feasible the flow of normal butane through pipe 26 is discontinued, flow of normal butane through catalyst supply vessel 12 is re-established, valves 16 and 32 are closed, and valve 18 is opened, and a mixture of butane and aluminum chloride is passed through valve 18 to the first end of zone B to supply aluminum chloride to the adsorptive mass in zone B. If desired, the adsorptive mass in zone A may be kept blanketed with a flowing stream of normal butane passed through pipe 10 and valve 15A. Passage of the butane-aluminum chloride mixture is continued until a sufficient amount of aluminum chloride has been taken up by the adsorptive mass in zone B, and preferably is discontinued while the effluent butane mixture passing through pipe 33 is still substantially free from aluminum chloride. It has been found that more desirable operation is obtained if zone B is purged of as much of the hydrogen chloride remaining therein as is possible prior to passing a butane-aluminum chloride mixture thereto.

After a sufficient amount of aluminum chloride has been introduced to zone B in the manner described, the flow of butane through catalyst supply vessel 12 is discontinued, valve 18 is closed, and normal butane at a suitable temperature is passed through pipe 44 and valve 45 to pipe 33 and the second end of zone B. Hydrogen chloride from pipe 30 and/or pipe 37 is added to this butane mixture through pipe 34. The butane-hydrogen chloride mixture, containing as before about 1 to about 5 per cent hydrogen chloride, passes through zone B, through valves 32 and 16 to zone A, and the effluent containing the isobutane produced by conversion is passed through pipes 20 and 21 to separating means 24. Operation of the two reaction zones B and A is continued as described for operation of zones A and B hereinbefore. When the activity of the catalyst has declined to such an extent that additional aluminum chloride should be added to the system, the aluminum chloride is added through valve 19 to the first end of zone A in the manner originally described and the cycle of operations which has been discussed is repeated.

The practice of my process with the two zones A and B has a disadvantage that the flow of materials is not always continuous. This may be partially compensated for, particularly in connection with the operation of the equipment included within separating means 24, by cycling hydrogen chloride in a closed cycle from separating means 24 through pipes 37 and 34 and valve 35. However, more nearly continuous operation may be effected by including a third zone of adsorptive catalyst-supporting material in the system designated in the drawing as zone C. In substance, zone C will be charged with aluminum chloride and used during a reaction portion of the cycle in conjunction with one of the other zones in a manner such as has been described. When operating with flow of normal butane and hydrogen chloride through zone A and zone B, zone C may be charged with aluminum chloride by passing an aluminum chloride-butane mixture from catalyst supply vessel 12 through pipe 14, pipe 17, and valve 50 to one end of zone C conveniently designated as the first end. An aluminum chloride-free butane effluent is passed from the second end of zone C through pipe 51 and pipe 52 and valve 55 to pipe 21 and separating means 24. Thus, by the time it is desired to discontinue reaction in A—B, zone C will be ready for operation and a butane mixture is added from pipe 10 and pipe 54 through valve 56 to pipe 51 and the second end of zone C. Hydrogen chloride is passed from pipe 34 through valve 57 to this stream. Effluents of zone C pass through valves 58 and 16 to zone A, and effluents of the reaction pass through pipes 20 and 21 to separating means 24. During this period of operation zone B is being charged with aluminum chloride through pipe 14, pipe 17 and valve 18. At the conclusion of the use of C—A, zone B has been charged with aluminum chloride and may be used in connection with zone C so that a butane-hydrogen chloride mixture is passed through pipe 33, zone B, valves 32 and 58, zone C, and pipes 51 and 52 and 21 to the separating means 24. In the meantime zone A is being charged with aluminum chloride through valve 19.

It will be understood that the flow diagram is schematic only, and that many additional pieces of equipment such as pressure gauges, flow meters, pumps, heat exchangers, and the like will be necessary in any particular installation and can be installed by anyone skilled in the art. The essential equipment and the material flows have been described in sufficient detail to serve as an efficient guide for making the necessary arrangement of specific equipment for a specific application of my invention. In connection with the discussion of the drawing, butane has been both the catalyst carrier and the reactant in the subsequent conversion portion of the process. It will be understood that some other saturated hydrocarbon or even some non-hydrocarbon gas may be used as a catalyst carrier during the time that catalyst is supplied to the adsorptive mass. Thus, when isomerizing a normally liquid hydrocarbon fraction I prefer to use a normally gaseous paraffin when supplying catalyst in the manner described. Likewise, when alkylating aromatic hydrocarbons I prefer to use a material such as propane or butane to supply the fugitive catalyst. When some non-hydrocarbon process is practiced in accordance with my invention, such as the hereinbefore discussed "Deacon" process, a gas, such as air, may be used to bring in fresh quantities of the desired catalyst. As will be appreciated from this discussion and from the description and discussion presented in connection with the drawing, it is preferred to charge the adsorptive mass with a fugitive catalyst which is contained in a nonreactive mixture.

As an example of the practice of my invention, two zones A and B may be filled with granular bauxite previously dehydrated at 1100° F. to a water content of about 1 per cent. Normal butane is charged through pipe 10, a portion of the stream is passed at 300° F. through catalyst supply vessel 12 filled with granular aluminum chloride, and is then mixed with the rest of the butane stream at the same temperature and passed through valve 19 to the first end of zone A. When zone A has taken up a total amount of aluminum chloride equal to about 5 per cent by weight of the total amount of bauxite contained therein, the catalyst supply vessel is disconnected from the system and normal butane at about 200° F. is passed through pipe 26, has admixed with it 3 per cent by weight of hydrogen chloride through pipe 21, and is passed through pipe 20 to the second end of zone A. Effluents of zone A passing through valve 16 contain about 40 per cent of isobutane. This mixture is passed through valve 32 and zone B for removal of aluminum chloride. Effluents of zone B are passed through pipes 33, 34 and 21 to separating means 24. The isobutane is recovered and sent to an alkylation process through pipe 36; hydrogen chloride with a small amount of propane is recycled through pipe 37 and valve 38, and unreacted normal butane is recycled through pipe 25. After about the third day the catalyst activity declines sufficiently that the material passing through pipe 33 contains only about 35 per cent of isobutane and the temperature of the butane stream passing through pipe 20 is raised to about 225° F. to bring the isobutane content of this effluent passing through pipe 33 back to about 40 per cent. This procedure of raising the temperature is continued until at the end of another week of operation the material is at a temperature of 300° F. as it enters zone A through pipe 20. When the isobutane content of the material passing through pipe 33 has decreased again to a value of about 35 per cent, at this inlet temperature, the supply of hydrogen chloride is cut off by closing valve 22 and the hydrogen chloride passing through pipe 37 is returned directly to the separating system 24 through valve 35 and pipe 21. When the material passing through pipe 33 is substantially free from hydrogen chloride, valve 18 is opened, valve 16 closed, and a portion of the normal butane is passed through catalyst supply vessel 12. Charging of aluminum chloride in this manner is continued for about 12 hours, at the end of which time there is only a trace of aluminum chloride in the material passing through line 33. At this time catalyst supply vessel 12 is disconnected from the system, the normal butane is passed from pipe 10 through pipe 44 and valve 45 and through pipe 33 at a temperature of about 200° F.; valve 18 is closed, valves 32 and 16 opened; hydrogen chloride is added to the stream through pipe 34, and an isobutane fraction is passed from zone A through pipes 20 and 21 to separating means 24. The conversion with flow through zones B and A is continued following substantially the same schedule for raising the temperature as was followed when the conversion took place through zones A and B.

It will be appreciated that various modifications of my invention may be practiced as has been previously discussed herein, and that the invention should not be unduly restricted by specific limitations which have been discussed in connection with specific modifications of my invention.

I claim:

1. A process for the isomerization of normal butane to form isobutane, which comprises passing a gaseous normal butane-aluminum chloride mixture, in the substantial absence of any hydrogen halide, to the first end of a first elongated zone containing a stationary mass of adsorptive catalyst support and thereby effecting deposition of the aluminum chloride content of said mixture on said support, continuing to pass said mixture until said mass contains a catalytic amount of aluminum chloride, the concentration of said aluminum chloride being highest at said first end and decreasing to substantially zero at said second end, discontinuing passing said mixture prior to the appearance of any substantial amounts of aluminum chloride in the effluent from the second end of said zone, subsequently passing a gaseous normal butane-hydrogen chloride mixture to said second end of said first zone, maintaining the contents of said zone under isomerization conditions, passing gaseous effluents from the first end of said first zone to the first end of a second elongated zone containing a stationary mass of adsorptive catalyst support under conditions such that effluents of said second zone are substantially free from aluminum chloride, passing effluents from the second end of said second zone to separating means and recovering therefrom isobutane so produced, discontinuing the last said flow of material when the catalyst activity has decreased to an undesired extent, passing a gaseous normal butane-aluminum chloride mixture, in the absence of any hydrogen halide, to said first end of said second zone and thereby effecting deposition of the aluminum chloride content of said mixture on said support, continuing to pass said mixture until said mass contains a catalytic amount of aluminum chloride, the concentration of said aluminum chloride being highest at said first end and decreasing to substantially zero at said second end, discontinuing passing said mixture prior to the appearance of any substantial amounts of aluminum chloride in the effluent of the second end of said second zone, subsequently passing a gaseous normal butane-hydrogen chloride mixture to said second end of said second zone, maintaining the contents of said zone under isomerization conditions, passing gaseous effluents from the first end of said second zone to the first end of said first zone under conditions such that the effluents of said first zone are substantially free from aluminum chloride, and passing effluents from the second end of said first zone to separating means and recovering therefrom isobutane so produced.

2. The process of claim 1 in which the said sequence of operations is repeated when the catalyst activity in said second zone has decreased to an undesired extent.

3. The process of claim 1 in which the adsorptive mass is maintained at a temperature within the range of about 250 to about 350° F. during contact with said butane-aluminum chloride mixture, in which subsequent isomerization in said zone is at an initial temperature within the range of about 175 to 250° F., and in which the isomerization temperature is raised as the catalyst activity declines to a maximum temperature within the range of about 275 to about 325° F.

4. A process for the isomerization of a low-boiling saturated hydrocarbon material, which comprises passing a mixture of a saturated hydrocarbon material and a volatile metal halide isomerization catalyst, in the substantial absence of any hydrogen halide, to the first end of a first elongated zone containing a mass of adsorptive catalyst support, discontinuing passing said mixture prior to the appearance of any substantial amount of said metal halide in the effluent from the second end of said first zone, subsequently passing a mixture comprising a hydrogen halide and a low-boiling saturated hydrocarbon material to be isomerized to the second end of said first zone, maintaining the contents of said first zone under isomerization conditions, passing effluents from the first end of said first zone to the first end of a second elongated zone containing a mass of adsorptive catalyst support under conditions such that effluents from the second end of said second zone are substantially free from metal halide catalyst, passing effluents of said second zone to separating means and recovering therefrom an isomerized product, discontinuing the last said flow of material when the catalyst activity has decreased to an undesired extent, passing a mixture of a saturated hydrocarbon material and a volatile metal halide isomerization catalyst, in the substantial absence of any hydrogen halide, to the first end of said second zone, discontinuing passing said mixture prior to the appearance of any substantial amount of said metal halide in the effluent from the second end of said second zone, subsequently passing a mixture comprising a hydrogen halide and a low-boiling saturated hydrocarbon material to be isomerized to the second end of said second zone, maintaining the contents of said second zone under isomerization conditions, passing effluents from the first end of said second zone to the first end of said first zone under conditions such that effluents from the second end of said first zone are substantially free from metal halide catalysts, and passing effluents of said first zone to separating means and recovering therefrom an isomerized product.

5. The process of claim 4 in which said metal halide is a volatile aluminum halide and in which said saturated hydrocarbon material to be isomerized is a normally liquid fraction boiling in the gasoline range.

6. The process of claim 4 in which said metal halide is aluminum bromide.

7. The process of claim 4 in which said metal halide is aluminum chloride.

8. The process of claim 4 in which said metal halide is aluminum chloride and said hydrogen halide is hydrogen chloride, in which said mixture of a saturated hydrocarbon material and said metal halide is a mixture of a substantially pure normally gaseous paraffin and aluminum chloride, and in which said saturated hydrocarbon material to be isomerized is a normally liquid fraction boiling in the gasoline range.

9. A process for the isomerization of normal butane to form isobutane, which comprises passing a normal butane-aluminum chloride mixture, in the substantial absence of any hydrogen halide, to the first end of a first elongated zone containing a mass of adsorptive catalyst support, discontinuing passing said mixture prior to the appearance of any substantial amounts of aluminum chloride in the effluent from the second end of said zone, subsequently passing a normal butane-hydrogen chloride mixture to said second end of said first zone, maintaining the contents of said zone under isomerization conditions, passing effluents from the first end of said first zone to the first end of a second elongated zone containing a mass of adsorptive catalyst support under conditions such that effluents of said second zone are substantially free from aluminum chloride, passing effluents from the second end of said second zone to separating means and recovering therefrom isobutane so produced, discontinuing the last said flow of material when the catalyst activity has decreased to an undesired extent, passing a normal butane-aluminum chloride mixture, in the absence of any hydrogen halide, to the first end of a third elongated zone containing a mass of adsorptive catalyst support, discontinuing passing said mixture prior to the appearance of any substantial amounts of aluminum chloride in the effluent from the second end of said third zone, subsequently passing a normal butane-hydrogen chloride mixture to said second end of said third zone, maintaining the contents of said third zone under isomerization conditions passing effluents from the first end of said third zone to the first end of said first zone under conditions such that effluents of said first zone are substantially free from aluminum chloride, passing effluents from said first zone to separating means and recovering therefrom isobutane so produced, discontinuing the last said flow of material when the catalyst activity has decreased to an undesired extent, passing a normal butane-aluminum chloride mixture, in the absence of any hydrogen halide, to said first end of said second zone, discontinuing passing said mixture prior to the appearance of any substantial amounts of aluminum chloride in the effluent of the second end of said second zone, subsequently passing a normal butane-hydrogen chloride mixture to said second end of said second zone, maintaining the contents of said zone under isomerization conditions, passing effluents from the first end of said second zone to the first end of said third zone under conditions such that the effluents of said third zone are substantially free from aluminum chloride, and passing effluents from the second end of said third zone to separating means and recovering therefrom isobutane so produced.

10. The process of claim 9 in which the said sequence of operations is repeated when the catalyst activity in said second zone has decreased to an undesired extent.

11. The process of claim 9 in which said third zone is charged with a butane-aluminum chloride mixture during the use of said first and second zones to isomerize normal butane, and in which said second zone is charged with a butane-aluminum chloride mixture during the use of said third and first zones to isomerize normal butane.

12. The process of claim 9 in which said sequence of operations is repeated when the catalyst activity in said second zone has decreased to an undesired extent and in which, after the process is started, the charging of a zone with a butane-aluminum chloride mixture is carried out while the other two zones are used to isomerize normal butane.

JEAN PAUL JONES.